US008555279B2

United States Patent
Nonaka et al.

(10) Patent No.: US 8,555,279 B2
(45) Date of Patent: Oct. 8, 2013

(54) RESOURCE ALLOCATION FOR CONTROLLER BOARDS MANAGEMENT FUNCTIONALITIES IN A STORAGE MANAGEMENT SYSTEM WITH A PLURALITY OF CONTROLLER BOARDS, EACH CONTROLLER BOARD INCLUDES PLURALITY OF VIRTUAL MACHINES WITH FIXED LOCAL SHARED MEMORY, FIXED REMOTE SHARED MEMORY, AND DYNAMIC MEMORY REGIONS

(75) Inventors: Yusuke Nonaka, Sagamihara (JP); Shoji Kodama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 216 days.

(21) Appl. No.: 13/128,525

(22) PCT Filed: Apr. 25, 2011

(86) PCT No.: PCT/JP2011/002397
§ 371 (c)(1),
(2), (4) Date: May 10, 2011

(87) PCT Pub. No.: WO2012/147116
PCT Pub. Date: Nov. 1, 2012

(65) Prior Publication Data
US 2012/0272241 A1 Oct. 25, 2012

(51) Int. Cl.
*G06F 9/455* (2006.01)
*G06F 9/46* (2006.01)

(52) U.S. Cl.
USPC .............................................. 718/1; 718/104

(58) Field of Classification Search
USPC .......................................................... 718/1
See application file for complete search history.

(56) References Cited

U.S. PATENT DOCUMENTS

| 7,257,811 | B2* | 8/2007 | Hunt et al. ......................... 718/1 |
| 7,490,324 | B2* | 2/2009 | Shultz et al. ....................... 718/1 |
| 7,925,841 | B2* | 4/2011 | Rao ................................. 711/147 |
| 8,464,257 | B2* | 6/2013 | Banerjee et al. ................... 718/1 |

(Continued)

FOREIGN PATENT DOCUMENTS

| JP | 2002-157133 A | 5/2002 |
| JP | 2005-215947 A | 8/2005 |

OTHER PUBLICATIONS

International Search Report and the Written Opinion of the International Searching Authority from PCT/JP2011/002397 filed on Apr. 25, 2011.

*Primary Examiner* — Lewis A Bullock, Jr.
*Assistant Examiner* — Kevin X Lu
(74) *Attorney, Agent, or Firm* — Volpe and Koenig, P.C.

(57) ABSTRACT

Provided is a computer system capable of linking and integrally operating a plurality of virtual machines. In this regard, a memory management mechanism capable of securing a shared memory secured, before the activation of the virtual machines, in a physical address that can be designated and capable of securing local memories corresponding to the number of the virtual machines is realized. In relation to a virtual system realized by a cooperation process by the plurality of virtual machines using part of physical hardware, a fixed area, in which the physical address and the size are determined at the activation of a hypervisor, and a dynamic allocation area, which is managed by the hypervisor, allocated from a memory pool that is shared by virtual machines that execute other functions, and in which the physical address and the size are determined at the activation of the virtual machines, are allocated to the virtual machines constituting the virtual machine group.

12 Claims, 11 Drawing Sheets

(56) References Cited

U.S. PATENT DOCUMENTS

2005/0149940 A1* 7/2005 Calinescu et al. ............ 718/104
2006/0236050 A1* 10/2006 Sugimoto et al. ............ 711/162
2007/0124550 A1   5/2007 Nonaka et al.
2007/0233838 A1  10/2007 Takamoto et al.
2010/0125843 A1   5/2010 Saito et al.
2010/0138831 A1*  6/2010 Inoue et al. .................... 718/1
2011/0083131 A1   4/2011 Pirzada et al.
2012/0117555 A1*  5/2012 Banerjee et al. ............ 717/168

* cited by examiner

RESOURCE ALLOCATION FOR CONTROLLER BOARDS MANAGEMENT FUNCTIONALITIES IN A STORAGE MANAGEMENT SYSTEM WITH A PLURALITY OF CONTROLLER BOARDS, EACH CONTROLLER BOARD INCLUDES PLURALITY OF VIRTUAL MACHINES WITH FIXED LOCAL SHARED MEMORY, FIXED REMOTE SHARED MEMORY, AND DYNAMIC MEMORY REGIONS

TECHNICAL FIELD

The present invention relates to a computer system and a virtual machine control method, and for example, to a technique that is capable of setting a plurality of virtual machines and that causes the plurality of virtual machines to process a command from a host computer.

BACKGROUND ART

In a storage system constituting a computer system, there is a technique realizing a function of storing data accessed based on a file protocol (such as NFS and CIFS) and data accessed based on a block protocol (such as FibreChannel and iSCSI) by a single controller board.

For example, Patent Literature 1 discloses a multi-protocol storage system, in which simultaneous access based on the file protocol and the block protocol is possible, and the capacity can be flexibly allocated to volumes accessed based on the protocols. In Patent Literature 1, some processors of a controller board including a multiprocessor execute a file protocol process, and other processors execute a block protocol process. Each part of the controller board that executes a type of protocol process can be assumed as a virtual machine.

Furthermore, for example, Patent Literature 2 discloses a system for realizing a shared memory while realizing flexible memory allocation to virtual machines.

CITATION LIST

Patent Literature

{PTL 1} JP Patent Publication (Kokai) No. 2005-215947A
{PTL 2} JP Patent Publication (Kokai) No. 2002-157133A

SUMMARY OF INVENTION

Technical Problem

A change or the like in the amount of commands of the protocols issued by the host changes processor resources used by a file storage control program that executes the file protocol process and used by a block storage control program that executes the block protocol process. Therefore, it is desirable that the number of processors allocated to the programs can be changed to an optimal ratio.

A plurality of virtual machines need to integrally realize the block protocol process to increase or decrease the number of virtual machines (also called VM) on the controller board to realise a virtual storage system. More specifically, even if a plurality of virtual machines execute the block protocol process, it is desirable that the plurality of virtual machines operate as one storage system for the host computer.

However, the number of processors allocated to the protocol processes and the memory allocation are fixed in Patent Literature 1 and cannot be changed. Therefore, the virtual machines cannot be increased or decreased on the controller board in Patent Literature 1.

In Patent Literature 2, a shared memory can be realized while realizing flexible memory allocation to the virtual machines. However, since a memory once allocated to the virtual machines is shared, a memory of a physical address reserved before the activation of the virtual machines cannot be shared. Therefore, based on Patent Literature 2, a plurality of virtual machines cannot be linked to constitute a storage system to integrally operate the virtual machines.

The present invention has been made in view of the circumstances, and the present invention provides a technique capable of linking a plurality of virtual machines to cause the plurality of virtual machines to operate as one system when the system is constituted while increasing or decreasing the virtual machines on a controller board.

Solution to Problem

To solve the problems, the present invention realizes a memory management mechanism capable of allocating a shared memory reserved, before the activation of virtual machines, in a physical address that can be designated and capable of allocating local memories corresponding to the number of the virtual machines. In this regard, the present invention is a virtual system that realizes an integral system by a cooperation process by a plurality of virtual machines (virtual machine group) using part of physical hardware, the virtual system including: a fixed area (for example, used by a block storage function), in which the physical address and the size are determined at the activation of a hypervisor, for the virtual machines constituting the virtual machine group; and a dynamic allocation area that is managed by the hypervisor, allocated from a memory pool shared with a virtual machine that executes a function (for example, file storage function or application processing function) different from the function (for example, block storage function) realized by the integral system, and in which the physical address and the size are determined at the activation of the virtual machine. The system allocates storage areas among the areas to the virtual machines.

More specifically, a computer system (storage subsystem) of the present invention includes: a processor that generates a virtual machine by securing hardware resources in accordance with an allocation request; and a memory that stores at least virtual machine setting information for setting the virtual machine and virtual machine management information for managing the virtual machine. The memory includes: a fixed area for storing information shared by a plurality of virtual machines; and a pool area for storing information specific to each of the plurality of virtual machines. When the virtual machine is activated in response to a request, the processor allocates the fixed area shared and used by the plurality of virtual machines to the virtual machine to be activated, dynamically allocates a specific storage area to the virtual machine to be allocated from the pool area, and enables the plurality of virtual machines to cooperate and operate.

Further features related to the present invention will be apparent from the description and the attached drawings of the present specification. Modes of the present invention are attained and realized by elements, combinations of various elements, the following detailed description, and modes of the attached claims.

The description of the present specification is merely a typical illustration, and it needs to be understood that the description does not limit the claims and examples of application of the present invention in any sense.

Advantageous Effects of Invention

According to the present invention, a plurality of virtual machines can be linked to cause the plurality of virtual machines to operate as one system when the system is constituted while increasing or decreasing the virtual machines on a controller board.

DESCRIPTION OF EMBODIMENTS

Figure 1:
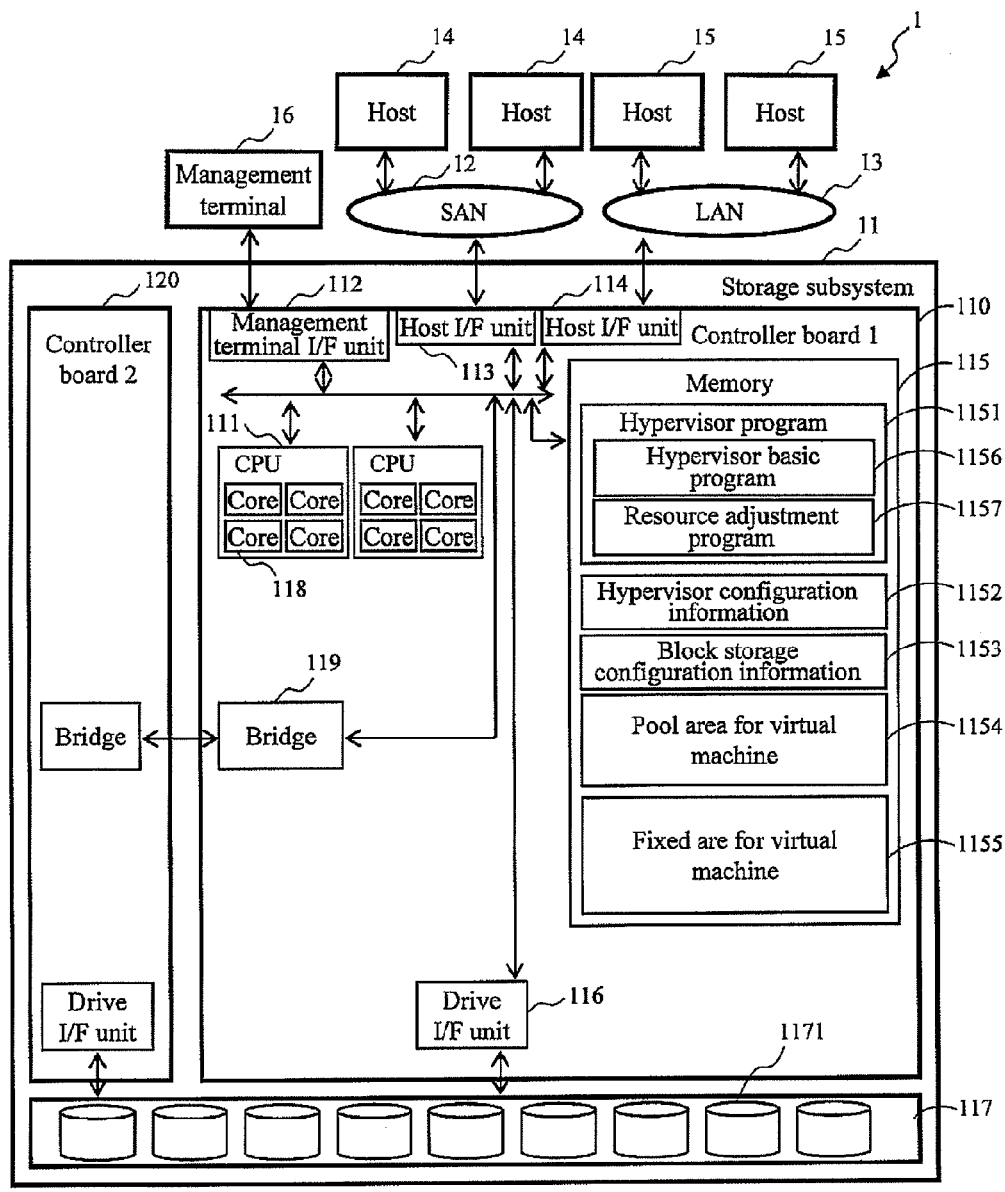
FIG. 1 is a diagram showing a schematic configuration of an entire storage system according to an embodiment of the present invention.

The present invention provides a technique capable of linking a plurality of virtual machines (also called VMs) to cause the plurality of virtual machines as one system when the system is constituted while increasing or decreasing the virtual machines on a controller board. In the system, for example, the number of virtual machines that execute a block protocol control program is increased or decreased on the controller board. The increase or decrease in the number of virtual machines is controlled by changing the allocation of storage areas and processors (cores) to the virtual machines. In order for the plurality of virtual machines to integrally realize the block protocol process, predetermined storage areas need to be persistently reserved by the block protocol process regardless of the configuration of the virtual machines, a physical address of the memory needs to be able to be designated for use from an interface device or the like, and the memory needs to be shared between the virtual machines. Memories corresponding to the number of virtual machines need to be allocated to execute the block protocol process by minimum memory consumption relative to the number of virtual machines. More specifically, although the number of virtual machines needs to be flexibly changed using a virtualization technique, a block storage controller that executes the block protocol process needs a fixed allocation of storage area through a hypervisor. Therefore, the two requests need to be satisfied to flexibly change the number of virtual machines.

The block storage controller is constituted by a plurality of virtual machines, and an object here is to realise a function (block storage function) in a load distributed manner. In this regard, the plurality of virtual machines need to be able to use the same hardware resources. For example, information for functioning as a block storage, such as configuration information of a cache memory and a logical unit in the storage system, needs to be shared persistently (even if the number of virtual machines is increased or decrease). Therefore, storage areas for storing the information (shared information) need to be secured in the memory regardless of the number of virtual machines. When a new virtual machine is activated, the storage areas reserved for the block storage storing the shared information needs to be attached to the activated virtual machine. If there are a plurality of controller boards to realize duplication (clustering), the controller boards need to be able to share storage areas that store the shared information.

Hereinafter, an embodiment of the present invention will be described with reference to the attached drawings. In the attached drawings, functionally the same elements may be displayed by the same reference numerals. Although the attached drawings illustrate a specific embodiment and an example of implementation according to the principle of the present invention, the attached drawings are for the understanding of the present invention and are not used in any way to restrictively interpret the present invention.

Although the present embodiment describes the present invention in detail enough for those skilled in the art to carry out the present invention, other implementations and modes are also possible, and it needs to be understood that changes in configurations and structures as well as replacements of various elements are possible without departing from the range and the spirit of the technical concept of the present invention. Therefore, the following description should not be interpreted restrictively.

Furthermore, as described below, the embodiment of the present invention may be implemented by software operated on a general-purpose computer, or may be implemented by dedicated hardware or a combination of software and hardware.

Although information of the present invention will be described in "table" formats in the following description, the information does not have to be expressed by data structures based on tables, and the information may be expressed by data structures, such as a list, a DB, and a queue, or by other ways. Therefore, the "table", the "list", the "DB", the "queue", and the like may be simply called "information" to indicate independence from the data structure.

Expressions, such as "identification information", "identifier", "name", "name", and "ID", can be used to describe the content of the information, and the expressions can replace each other.

Although a "program" serves as a subject (operational entity) to describe processes in the embodiment of the present invention, the program is executed by a processor to execute a predetermined process while using a memory and a communication port (communication control apparatus). Therefore, the processor may serve as a subject in the description. A process disclosed with the program serving as the subject may be a process executed by a computer or information processing apparatus such as a management server. Part or the entire program may be realized by dedicated hardware or may be modularized. Various programs may be installed on computers through a program distribution server or storage media.

<Configuration of Storage System>

FIG. 1 is a diagram showing a schematic configuration of a storage system according to the embodiment of the present invention.

A storage system 1 (can also be called a computer system) includes at least one storage subsystem 11 (this can also be called a computer system), at least one management terminal 16, and at least one host computer 14 or host computer 15. The host computer 14 or the host computer 15 is connected to the storage subsystem 11 through, for example, a SAN 12 or a LAN 13.

The storage subsystem 11 includes storage areas realized by storage media included in a drive unit (disk device group) 117 and executes reading/writing of data (user data) of the storage areas based on a command from the host computer 14 connected to the SAN 12 or the host computer 15 connected to the LAN 13.

The host computer 14 connected to the SAN 12 communicates with the storage subsystem 11 based on the block protocol, and the host computer 15 connected to the LAN 13 communicates with the storage subsystem 11 based on the file protocol. Although the present embodiment illustrates a configuration in which the hosts or the networks using the block protocol and the file protocol are different, one host may access the storage subsystem 11 based on both the block protocol and the file protocol, and the block protocol and the file protocol may share the networks or host I/Fs of the storage subsystem 11.

The storage subsystem 11 changes parameters, such as a configuration of logical unit (LU) in the storage area, based on a command from a management terminal 16.

Controller boards (also called "storage controllers") 110 and 120 constitute the center of the storage subsystem 11, interpret commands received from the host computer 14 or the host computer 15, and execute reading/writing to and from the storage areas included in the drive unit 117. In the present embodiment, the storage subsystem 11 includes two controller boards to improve the availability by duplication (clustering). Although not illustrated in detail, the controller board 2_120 has the same internal configuration as the controller board 1_110. The controllers are connected by a bridge 119. The bridge 119 has a function of providing, by a controller board, accessible areas (shared storage areas) for a physical address of the memory 115 of the other controller board. More specifically, the function cannot be realized unless the other controller board figures out the location of the shared storage areas on a physical address basis. Such shared storage areas allow the controller boards to share information for realizing a linked operation of the plurality of virtual machines. For example, storage areas k, l, k', and l' in FIG. 3 described below are the accessible areas shared between the controller boards.

A storage controller 110 is controlled by a CPU 111 and is connected to the SAN 12 through a host I/F unit 113, connected to the LAN 13 through a host I/F unit 114, and connected to the drive unit 117 through a drive I/F unit 116. The storage controller includes one or a plurality of CPUs 111. The CPU 111 includes one or a plurality of cores 118. The CPU 111 is connected to a management terminal 16 through a management terminal I/F 112. The storage controller 120 is configured in the same way as the storage controller 110.

The drive unit 117 includes a plurality of storage media (disk devices) 1171.

The memory 115 includes a hypervisor program 1151 executed by the CPU 111, a hypervisor configuration information storage area 1152 defining the operation, a pool area for virtual machine 1154 as a memory dynamically allocated to a virtual machine executed on the hypervisor, a fixed area for virtual machine 1155 for fixed allocation to a virtual machine of a specific type, and a block storage configuration information storage area 1153 defining an operation of a block storage control program executed as a virtual machine.

The hypervisor program 1151 includes a hypervisor basic program 1156 for realizing basic functions of the hypervisor and a resource adjustment program 1157 for determining allocation of resources, such as cores, to the functions included in the storage controller.

<Logical Configuration of Storage Subsystem>

Figure 2:
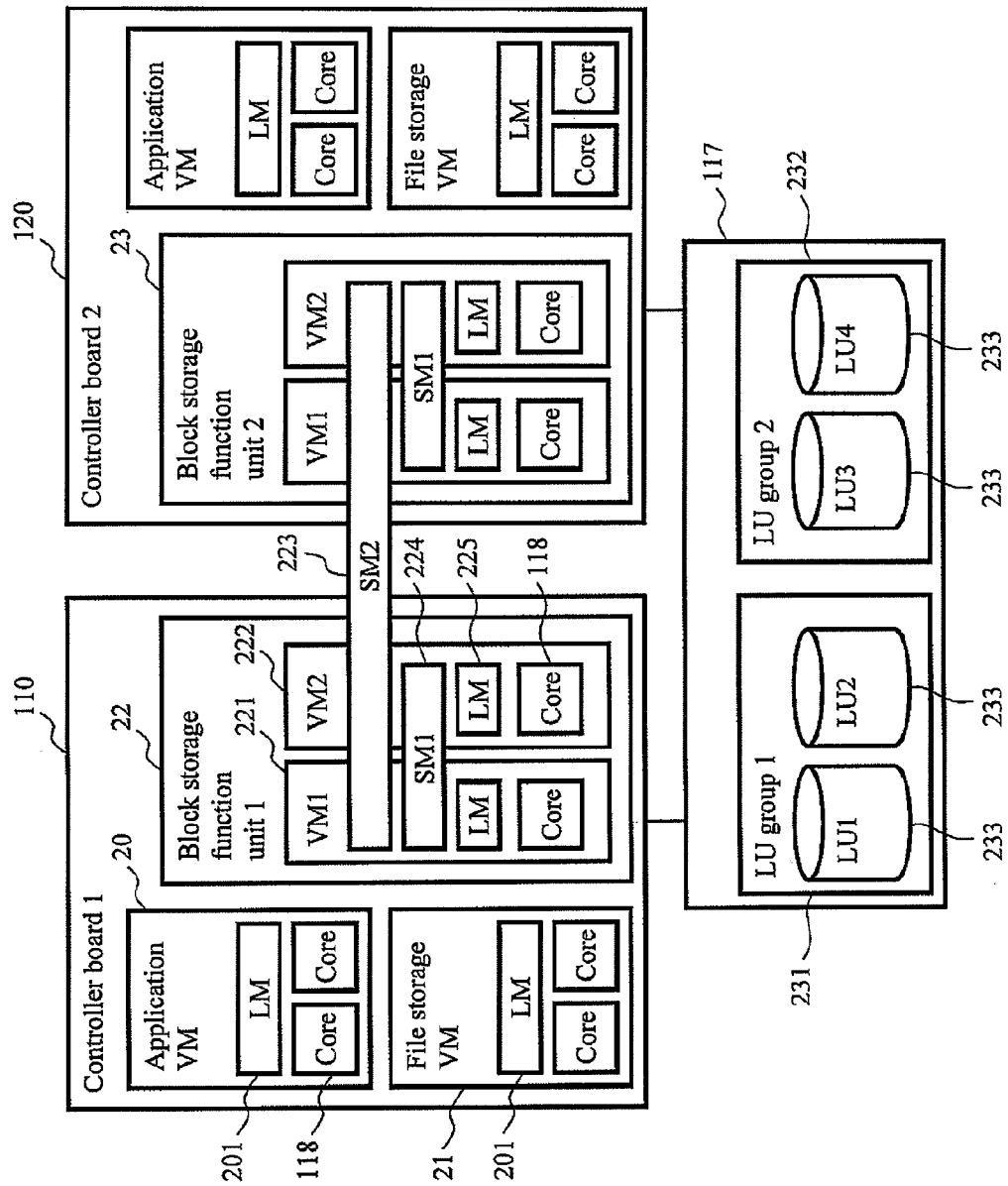
FIG. 2 is a block diagram showing an example of an interrelationship between a plurality of virtual machines.

FIG. 2 is a diagram for explaining virtual machines executed on controller boards and a logical configuration of functions realized by the virtual machines.

A block storage function unit 1_22 includes a plurality of virtual machines (VM 1_221 and VM 2_222 in the present embodiment) executed by the controller board 1_110, interprets commands from the host computer 14 connected to the SAN 12 and commands based on the block protocol from other virtual machines executed by the controller board 1_110, and executes reading/writing to and from an LU (Logical Unit) 233 included in the drive unit 117. The block storage function unit 1_22 has a function of improving the reliability by RAID (Redundant Array of Independent Disks) and enhancing the performance by cache. Although the block storage function unit 2_23 can have the same functions as the block storage function unit 1_22, the function units do not have to have exactly the same configurations and functions.

If the controller boards are normal, the block storage function unit 1_22 processes commands to an LU group 1_231, and the block storage function unit 2_23 executes commands to an LU group 2_232. However, if one of the controller boards is terminated by a failure, replacement, or the like, one of the block storage function units processes the commands to both LU groups.

The virtual machine (VM) 221 included in the block storage function unit 1_22 includes a core 118 and memories (SM (Shared Memory) 1_224, SM 2_223, and LM (Local Memory) 225) allocated from the hypervisor. Although one core is included in the virtual machine in the present embodiment, a plurality of cores may be allocated using a technique such as SMP (Symmetric Multi Processing). Among the memories, the SM 1_224 is a memory shared among all virtual machines included in the same block storage function unit and is allocated from the fixed area for virtual machine 1155. The SM 2_223 is a memory shared among all virtual machines (including virtual machines across the controller boards) included in all block storage function units constituting the storage system and is a storage area allocated from the fixed area for virtual machine 1155. The block storage function units use the shared memories to realize functions integrated as one set of storage systems. The LM 225 is a memory used only by a specific virtual machine and is a storage area allocated from the pool area for virtual machine 1154.

The file storage VM_21 is a virtual machine that realizes a function of processing commands by converting commands from the host computer 15 connected to the LAN 13 or from an application VM_20 based on the file protocol into the block protocol and transmitting the commands to the block storage function unit 22 or 23. The controller board 110 or 120 may include a plurality of file storage VM_21, and the file storage VM_21 includes the cores 118 allocated from the hypervisor and a memory (LM) 201 allocated from the pool area for virtual machine 1154.

The application VM_20 is a virtual machine, such as a Web server and a mail server, that executes application programs, and the controller board 110 or 120 may include a plurality of application VM_20. Like the file storage VM_21, the application VM_20 includes the cores 118 allocated from the hypervisor and the memory (LM) 201.

<Address Map of Memory>

Figure 3:
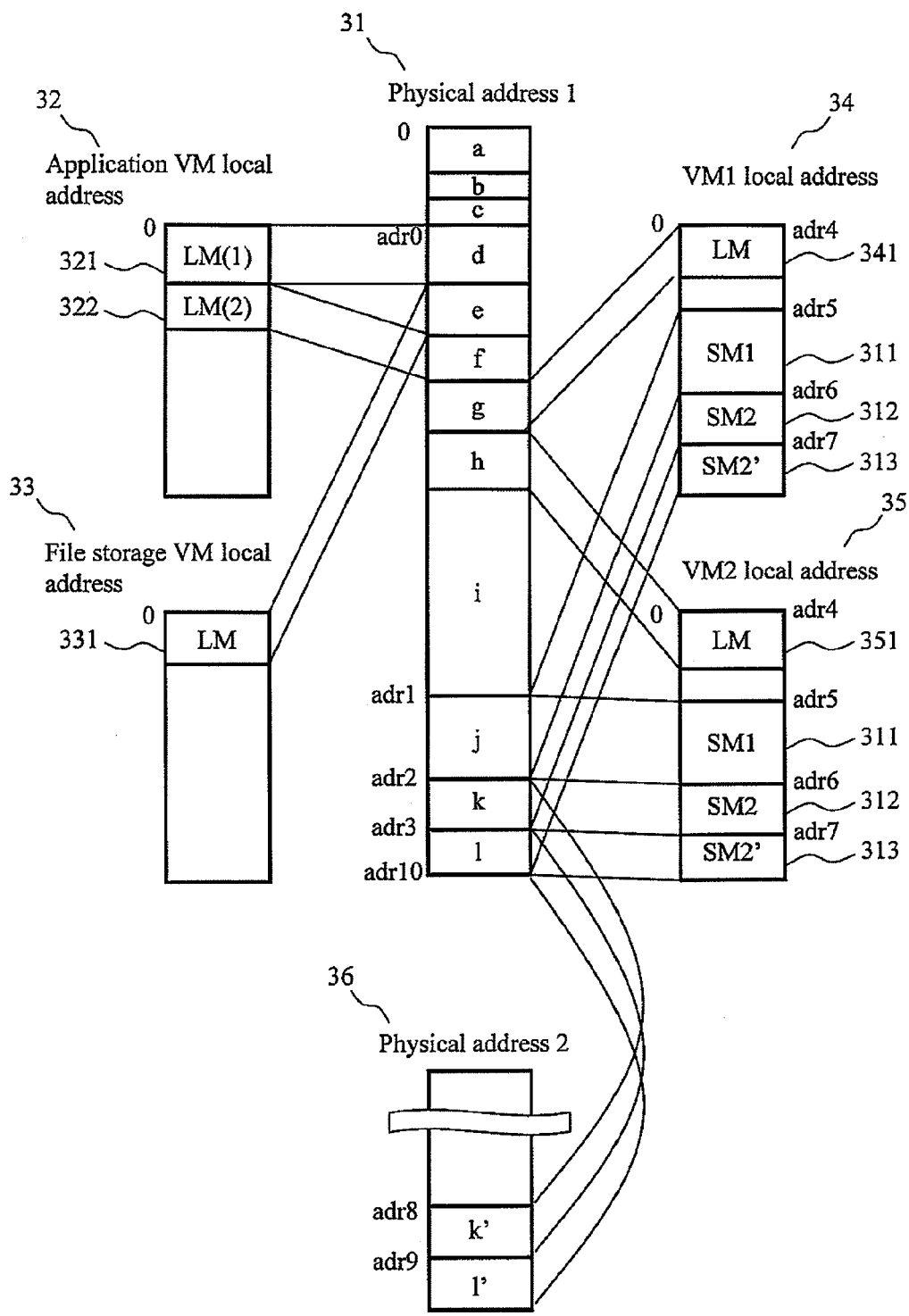
FIG. 3 is a diagram showing an example of an address map of a controller board.

FIG. 3 is a diagram for explaining an example of an address map of the controller boards 110 and 120. In FIG. 3, a physical address 1_31 denotes a physical address map of the controller board 1_110, and a physical address 2_36 denotes a physical address map of the controller board 2_120. The physical address 1_31 is divided into areas a to 1. The physical address map may include a memory map I/O in addition to the memory 115.

The area a is an area used by the hypervisor program 1151. The area b is an area where the hypervisor configuration information 1152 is arranged. The area c is an area where the block storage configuration information 1153 is arranged.

In the physical address 1_31, the areas included between an adr0 address and an adr1 address are the pool areas for virtual machine 1154. Therefore, when the VM is activated, the areas allocated to the LM are cut out from the areas from adr0 to adr1 and allocated. Because it is the LM, each VM can independently use the areas. The areas included between the adr1 address and an adr10 address are the fixed areas for virtual machine 1155.

An application VM local address 32, a file storage VM local address 33, a VM1 local address 34, and a VM2 local address 35 are address spaces recognized by programs executed on the virtual machines and are realized by a virtualization support function or a virtual memory function of hardware. Local addresses adr4 to adr7 of the VM 1_34 or the VM 2_35 are logical address spaces and are different from the physical addresses.

The area e of the physical address 1_31 is allocated to an LM 331 of the file storage VM local address 33. Physical addresses that are not continuous, such as the area d and the area f, are allocated in some cases, such as to the LM(1) 321 and an LM(2) 322 of the application VM local address 32.

The VM1 local address 34 of the virtual machine constituting the block storage function unit 1_22 includes an SM 1_311, an SM 2_312, and an SM 2'313 allocated from the fixed area for virtual machine 1155 in addition to an LM 341 allocated from the pool area for virtual machine 1154. The SM 2 and the SM 2' are memories shared among all virtual machines included in all block storage function units constituting the storage system. Therefore, the same physical memory as the physical address 2_36 as a physical address map of the controller board 2_120 is mapped to the area k and the areal of the physical address 1_31 corresponding to the SM 2 and the SM 2'. For example, as for the area k, the memory whose entity exists in the controller board 1_110 is mapped to an area As for an area l', the memory whose entity exists in the controller board 2_120 is mapped to the area l. Therefore, the areas k, l, k', and l' are areas that can be referenced by both the controller boards 1_110 and 2_120. Such an address conversion is realized by the bridge 119 as described above, and specifically, is realized by hardware such as Non-Transparent Bridge. The address conversion process by the bridge 119 may include restrictions on the number of mappable areas or on the physical addresses. Therefore, it is desirable that the developer or the user of the virtual machine can designate the physical address allocated from the fixed area for virtual machine 1155.

The VM2 local address 35 is the same as the VM1 local address 34, and the detailed description will not be repeated.

<Resource Request Table>

Figure 4:
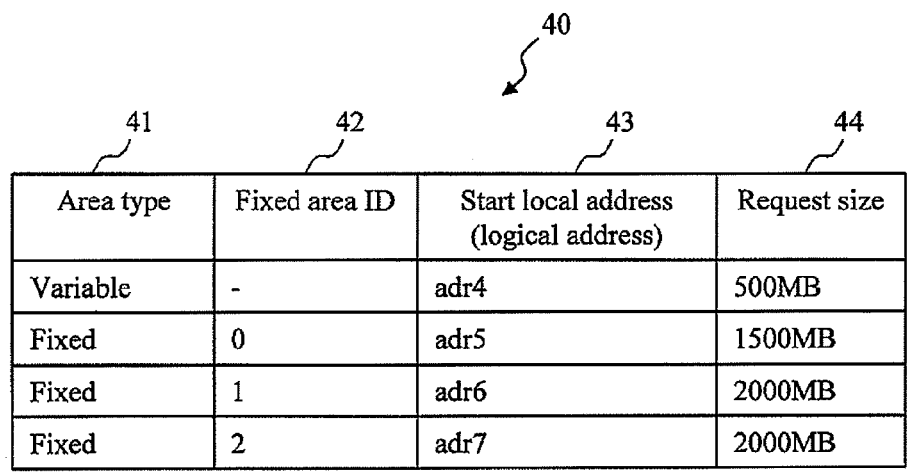
FIG. 4 is a diagram showing an example of configuration of a resource request table.

FIG. 4 is a diagram showing an example of configuration of a resource request table 40 included in the hypervisor configuration information storage area 1152. In the example, the resource request table is related to the physical addresses used by the virtual machines included in the block storage function units 22 and 23 and is information describing the content of requests to the hypervisors of the virtual machines. The resource request table 40 of FIG. 4 defines the storage area used by one VM.

The information of the resource request table 40 is loaded when the block storage function units 22 and 23 are expanded to the controller boards 110 and 120. Functions other than the block storage function units 22 and 23 are also set to define resources necessary when the virtual machines are activated.

Based on the table, the hypervisor program 1151 allocates areas for the block storage function units 22 and 23 to the physical addresses (see FIG. 3) when the virtual machines are activated or when the controller boards are activated. In the case of the application VM 20 and the file storage VM 21, the information is also acquired from corresponding resource request tables when the VMs or the controller boards are activated, and the physical addresses are allocated to the VMs. However, in the case of the application VM or the file storage VM, there are only variable areas, and fixed areas are not allocated.

The resource request table 40 includes, as configuration information, an area type 41, a fixed area ID 42, a start local address 43, and a request size 44.

The area type 41 is information indicating whether the allocation area is a variable area or a fixed area. If the area type 41 is "variable", the area is allocated from the pool area for virtual machine 1154 every time the virtual machine is activated. If the area type 41 is "fixed", the area is allocated from the fixed area for virtual machine 1155 when the controller board is activated. The fixed area ID 42 is an identifier of a fixed area in the controller board and is used for identification when the fixed area is mapped to the local address of the virtual machine. The start local address 43 denotes local addresses (logical addresses) of virtual machines for mapping the areas. The addresses correspond to the adr4 to adr7 of the VM1 local address 34 and the VM2 local address 35 of FIG. 3. The request size 44 denotes the size requested for each area.

Although the present embodiment illustrates an example in which the virtual machines included in the block storage function units use all common resource request tables, a different request size 44 may be able to be set for each virtual machine in the areas in which the area type 41 is "variable". For example, large-sized areas may be secured as the LMs for less than a certain number of virtual machines, and small-sized areas may be secured as the LMs to secure more than a certain number of virtual machines because it is more likely that there would be a lack of free capacity of the pool area for virtual machine 1154.

<Fixed Area Management Table>

Figure 5:
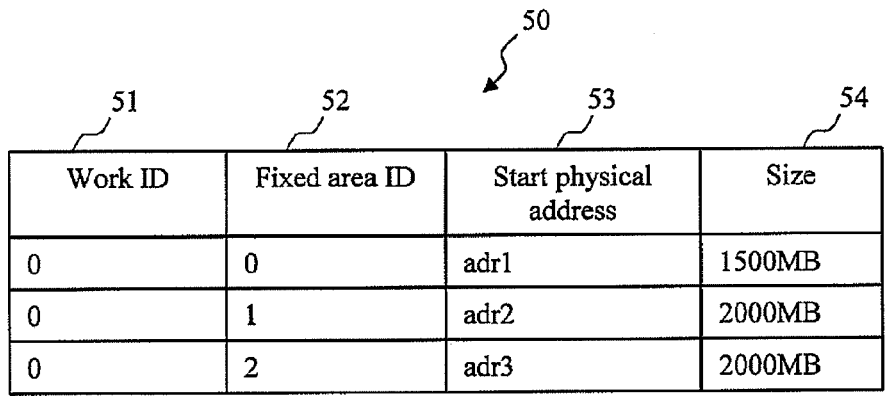
FIG. 5 is a diagram showing an example of configuration of a fixed area management table.

FIG. 5 is a diagram showing an example of configuration of a fixed area management table 50 included in the hypervisor configuration information storage area 1152. The fixed area management table 50 includes information of fixed areas requested from the functions based on the information of the resource request table 40 described in FIG. 4. The hypervisor program 1151 determines the allocation of the fixed area for virtual machine 1155 based on the information of the table.

The fixed area management table 50 includes, as configuration information, a Work_ID 51, a fixed area ID 52, a start physical address 53, and a size 54.

The Work_ID 51 is information indicating the type of the function. In the example, the block storage function is defined as 0. The fixed area ID 52 corresponds to the fixed area ID 42 of FIG. 4 and is an identifier of the fixed area used by a specific function of the Work_ID in the controller board. The start physical address 53 denotes a start address of the physical address to which the fixed area is allocated. The size 54 denotes the size of the fixed area.

<Block Storage Function Configuration Table>

Figure 6:
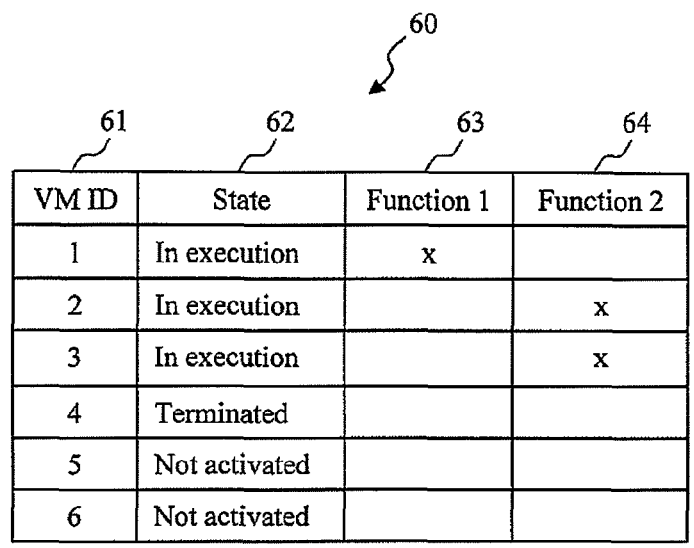
FIG. 6 is a diagram showing an example of configuration of a block storage function configuration table.

FIG. 6 is a diagram showing an example of configuration of a block storage function configuration table 60 included in the block storage configuration information storage area 1153. The block storage function configuration table 60 is a table for managing the configurations and states of the virtual machines included in the block storage function units 22 and 23.

The block storage function configuration table 60 includes, as configuration information, a VM_ID 61, a state 62, a function 1_63, and a function 2_64. The VM_ID 61 is information indicating identifiers of the virtual machines in the block storage function unit 22 or 23. The state 62 denotes the state of the virtual machine. If the state 62 is "in execution", there is a virtual machine, and a program is in execution. If the state 62 is "terminated", there has been a virtual machine in the past, but the virtual machine is contracted and does not currently exist. If the state 62 is "not activated", the virtual machine has not been activated even once. The function 1_63 and the function 2_64 are information indicating which virtual machine executes functions executed only by specific one or a plurality of virtual machines. Although two examples are illustrated here for the "function", all such functions are included in the table. Examples of the functions include a virtual port control function 96 of FIG. 9 described later, a failure inspection function by scanning of a storage medium executed asynchronously with a command in the block storage function unit, and a communication function of receiving a command from the management terminal 16.

Various processes are possible by managing the existence of the virtual machines using the block storage function configuration table 60. For example, a heartbeat destination for mutual monitoring for detecting abnormality of the virtual machine can be determined, and a broadcast message for notifying all virtual machines of a change in the shared memory, such as a change in storage area configuration information 83 (see FIG. 8) described below, can be transmitted. Furthermore, information on a virtual I/F necessary when single hardware, such as the drive I/F unit 116, is shared by a plurality of virtual machines can be merged to execute a process of converting into and setting a physical I/F. The heartbeat process is a process of detecting the VM terminated by a bug, a failure, or the like, and the VM of the communication partner can be checked from FIG. 6. This is because a response cannot be expected even if information for checking is transmitted to the "terminated" or "not activated" VM in FIG. 6. In the broadcast message transmission, the VM of the destination can be specified using FIG. 6, because the message needs to be transmitted only to the VM in execution.

<Internal Configuration of SM (Shared Memory) 1>

Figure 7:
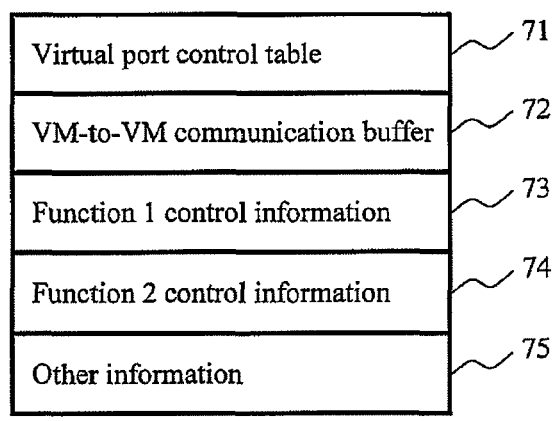
FIG. 7 is a diagram showing an example of configuration of a block storage shared memory (in the same controller board).
Figure 8:
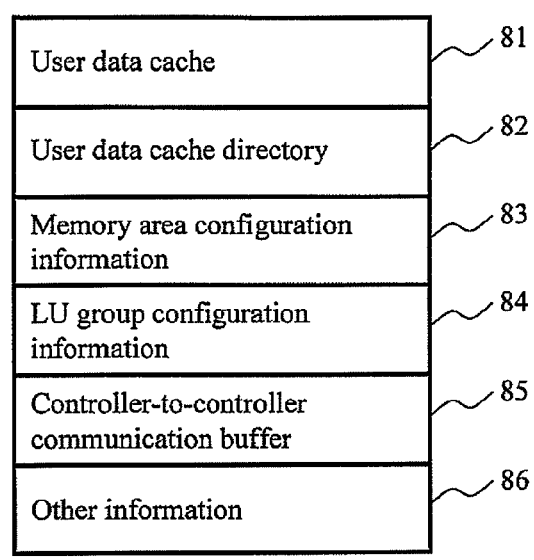
FIG. 8 is a diagram showing an example of configuration of a block storage shared memory (between different controller boards).

FIG. 7 is a diagram showing an example of configuration of the SM 1_224 shared in one controller board among the shared memories of the block storage function unit 22. In conjunction with FIG. 8, FIG. 7 shows information necessary for a plurality of virtual machines to link and operate.

The SM (shared memory) in the controller board includes a virtual port control table area 71, a VM-to-VM communication buffer area 72, a function 1 control information storage area 73, a function 2 control information storage area 74, and other-information storage area 75. The number of prepared control information storage areas of function equals to the number of realized functions.

The virtual port control table area 71 is an area for storing a table that holds information used in a command distribution process described later in FIG. 9. The VM-to-VM communication buffer area 72 is an area for use as a buffer for communication, such as a request of processing between the virtual machines and a heartbeat.

The function 1 control information 73 and the function 2 control information 74 are areas storing control information used by functions (the virtual port control function, the failure inspection function, the communication function, and the like) executed by specific one or a plurality of virtual machines described in FIG. 6. The arrangement of the control information of the functions on the shared memory allows inheritance of the information to another virtual machine when a virtual machine is contracted. For example, since the function 1 (see FIG. 6) operated on the VM 1 is not operated on other VMs, another VM needs to inherit the function 1 when the VM 1 is terminated. For example, when the function 1 is a disk scan function, another VM can easily inherit the function 1 if the information of the area scanned before the termination of the VM 1 is stored in the function 1 control information storage area 73 as intermediate information, and it is efficient because the disk area already scanned by the VM 1 does not have to be scanned again.

The other-information storage area 75 is an area capable of temporarily cached data whose original is in the memory on the other controller and that is with a large access delay and storing other data shared between the virtual machines, such as a common program text.

<Internal Configuration of SM (Shared Memory) 2>

FIG. 8 is a diagram showing an example of configuration of the SM 2_223 shared by the entire storage subsystem 11 among the shared memory of the block storage function units 22 and 23.

The SM (shared memory) 2 in the controller board includes a user data cache area 81, a user data cache directory area 82, a storage area configuration information storage area 83, an LU group configuration information storage area 84, a controller-to-controller communication buffer area 85, and other-information storage area 86.

The user data cache area 81 is a cache area of the LU 233 designed to improve the performance of the block storage and includes dirty data not reflected in the LU 233 and clean data as a copy of the LU 233. For example, the area is an area for temporarily storing data read out from the drive unit 117 in response to an I/O request from the host computer 14 to allow immediate handling of the subsequent I/O requests for the same data.

The user data cache directory 82 is information managing the arrangement of the user data cache 81. Although one of the block storage function units 22 and 23 usually process the LU group 1_231 and the LU group 2_232, the unit that takes charge may be changed due to a failure or the like. To handle the change in the unit, the user data cache 81 and the user data cache directory 82 are arranged on the SM 2_223.

The storage area configuration information storage area 83 is an area that stores information related to general setting of the block storage, such as RAID configuration of the storage medium included in the drive unit 117 and mapping of the physical configuration and the logical configuration such as mapping to the LU 233. The information is, for example, referenced by a management tool executed by the management terminal 16 and changed by an operation of the LU definition or the like.

The LU group configuration information storage area 84 is an area that stores information indicating mapping of the LU 233 and the LU group 231 or 232. For example, in the LU configuration shown in FIG. 2, the area stores information indicating that the LU 1 and the LU 2 constitute the LU group 1_231 and that the LU 3 and the LU 4 constitute the LU group 2_232. Based on the information, the block storage function units can execute processing by recognizing the assignments.

The controller-to-controller communication buffer 85 is used for communication between the block storage function unit 1_22 and the block storage function unit 2_23 and is an area used for, for example, transmission of a heartbeat message and notification of a change in the LU group.

<Command Distribution Process to Virtual Machine>

Figure 9:
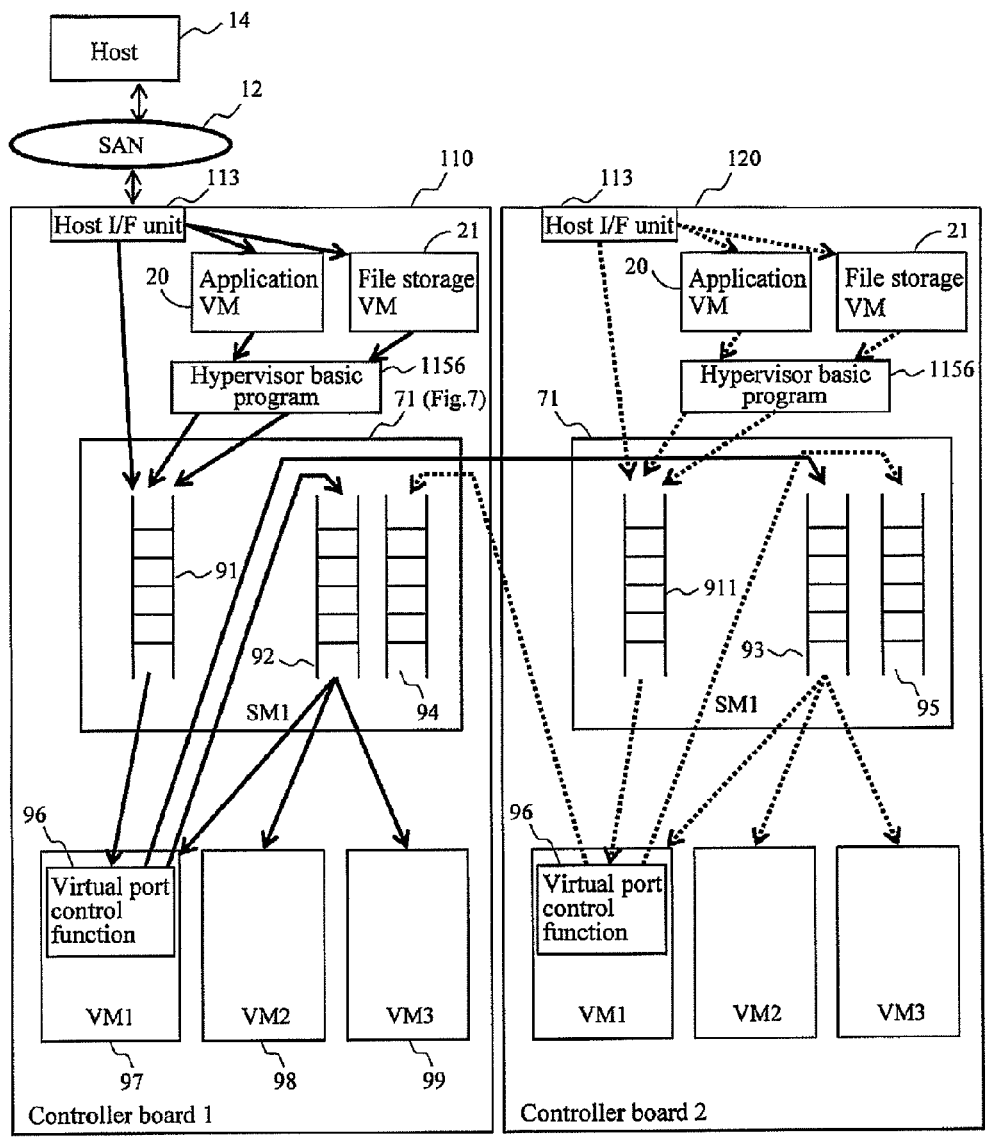
FIG. 9 is a diagram for explaining a command distribution process based on a virtual port function.

FIG. 9 is a diagram for explaining execution of a command distribution process from the block storage function unit to the virtual machines.

An access command based on the block protocol issued by the host computer 14 and received by the host I/F unit 113 is enqueued by a virtual port queue 91 in the virtual port control table 71 (see FIG. 7). The application VM 20 and the file storage VM 21 cannot directly write commands issued by the VMs to the virtual port control table 71. Therefore, the hypervisor basic program 1156 uses a VM-to-VM communication function included in the hypervisor basic program 1156 to write the commands to the virtual port control table 71 (see FIG. 7) to enqueue the commands to the virtual port queue 91. An existing technique of a shared memory or the like can be used for the VM-to-VM communication.

One of the virtual machines (VM 1_97 here) included in the block storage function unit 1_22 executes the virtual port control function 96. Therefore, the virtual machine (VM 1_97) transfers the command dequeued from the virtual port queue 91 to a queue 92 included in the controller board 1_110 and a queue 93 included in the controller board 2_120 based on the definition of the LU group (see the LU group configuration information 84 of FIG. 8).

A virtual machine with a free CPU among the VM 1_97, a VM 2_98, and a VM 3_99 included in the block storage function unit 1_22 dequeues the command from the queue 92 to execute the read out command. Command processing is similarly executed for the queue 93. A queue 94 and a queue 95 that enqueue commands transferred from a virtual port queue 911 of the controller board 2_120 are similarly arranged.

A plurality of virtual port queues 91 and 911 may be arranged in the virtual port control table 71, such as by setting the virtual port queues 91 and 911 for each port of the host I/F unit 113, by separating the storages of commands received by the host I/F unit 113 and commands received from the virtual machine in the controller board, or by setting the virtual port queues 91 and 911 for each processing group for which the performance needs to be secured. The issuer of the command recognizes, as external 11 Fs of the block storage function unit, only the configuration of the virtual port queues 91 and 911 that is determined independently from the number of virtual machines. The issuer does not have to directly recognize each virtual machine, and the setting does not have to be changed even if the virtual machines are increased or decreased.

<Virtual Machine Expansion Process>

Figure 10:
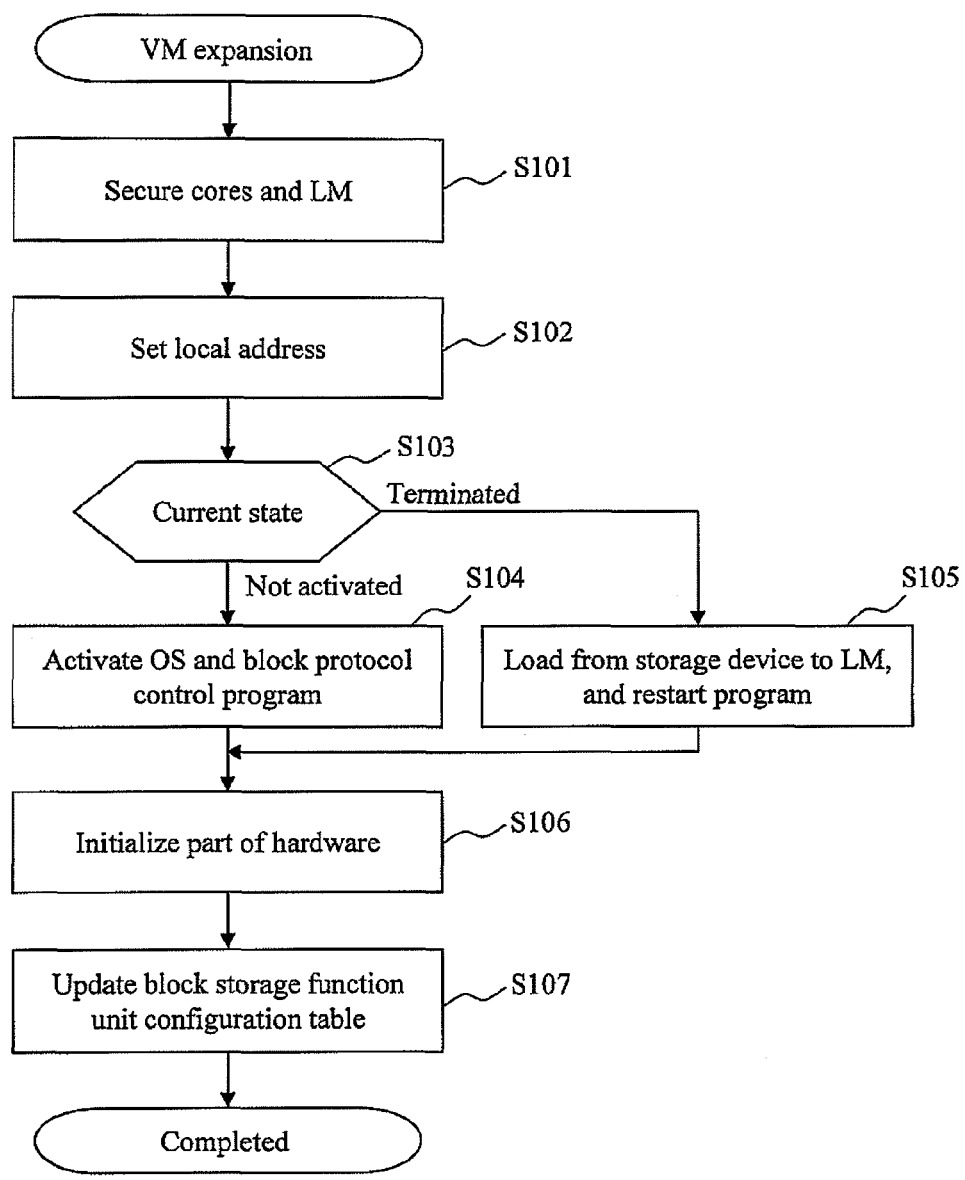
FIG. 10 is a flow chart for explaining an expansion process of the virtual machines.

FIG. 10 is a flow chart for explaining a process when the virtual machines are expanded in the block storage function unit. The resource adjustment program 1157 executes the expansion process of the virtual machines based on the reception of an instruction from the management terminal 16 or based on a core reallocation process described later in FIG. 13. The process is executed only when the state (the state 62 of FIG. 6) of the virtual machine is not "in execution". Although the number of virtual machines that can be set to the block storage function unit is predetermined in FIG. 6, the number of virtual machines may be able to be increased from the management terminal 16 beyond the predetermined range. In that case, a line of VM is added in FIG. 6, and the resource request table 40 holding the resource request information (information of the cores and LM necessary for the virtual machine) designated from the management terminal 16 is generated in association with the virtual machine. If the requested resource cannot be secured, the manager is notified of the fact through the management terminal 16. If the manager still wants to increase the number of virtual machines beyond the predetermined range, the request resource of the entire VM may be reconfigured. Hereinafter, a process of expanding the virtual machines within the range of the number of virtual machines preset in FIG. 6 will be described with reference to FIG. 10.

First, in step S101, the hypervisor program 1151 uses the resource adjustment program 1157 to secure the cores and LM as resources of the virtual machine to be expanded. The LM configuration is determined based on the resource request table 40 of FIG. 4.

In step S102, the resource adjustment program 1157 sets a local address of the virtual machine from the LM secured in step S101 and from the fixed area secured in advance at the activation of the controller board based on the resource request table 40 of FIG. 4.

In step S103, the resource adjustment program 1157 refers to the state (the state 62 of FIG. 6) of the virtual machine to be expanded to check whether the state of the VM is "not activated" or "terminated". If the state is "not activated", the process moves to step S104. If the state is "terminated", the process moves to S105.

In step S104, the resource adjustment program 1157 loads the OS and the block protocol control program from, for example, the storage device of the drive unit 117 to the LM on the virtual machine, and the cores execute the program.

In step S105, the resource adjustment program 1157 loads the content (can be called "saved image") of the LM during the previous execution saved, for example, in the storage device of the drive unit 117 during the contract of the virtual machine to the secured LM, and the cores restart the program.

In step S106, the resource adjustment program 1157 initializes the virtual I/F of hardware that is not shared by other virtual machines through the virtual machine among the hardware used by the virtual machine. An example of the hardware has a function of virtual I/Fs, the virtual I/Fs are allocated to the virtual machines, and the virtual I/Fs are shared by the function of the hardware without intervention, such as exclusive sharing between virtual machines. Alternatively, there are virtual I/Fs provided by the hypervisor. The virtual I/Fs denote I/F devices that allow a simulation that there are virtually a plurality of I/Fs even if there is physically one I/F. Therefore, the I/Fs are initialized by clearing the queues of the virtual I/Fs.

Lastly, in step S107, the resource adjustment program 1157 updates the state 62 of the block storage function configuration table (described in FIG. 6). More specifically, the state is changed from "not activated" or "terminated" to "in execution".

<Virtual Machine Contraction Process>

Figure 11:
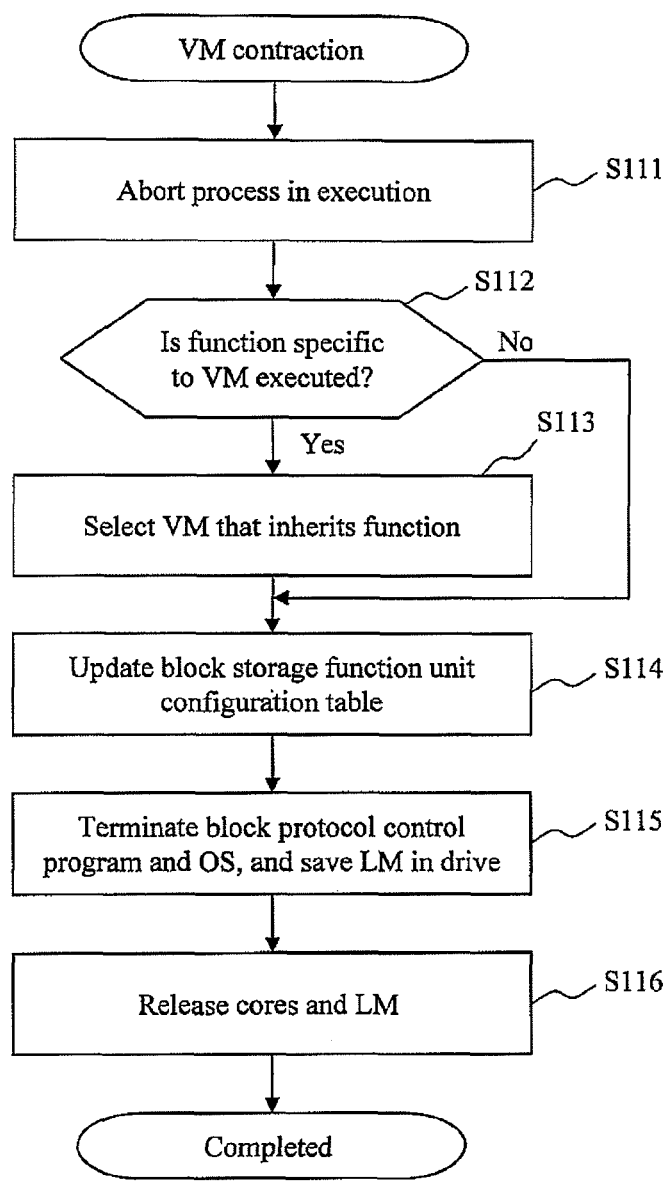
FIG. 11 is a flow chart for explaining a contraction process of the virtual machines.

FIG. 11 is a flow chart for explaining a process when the virtual machines are contracted from the block storage function unit. As in the expansion, the resource adjustment program 1157 contracts the virtual machines based on the reception of an instruction from the management terminal 16 or based on the core reallocation process described later in FIG. 13. The contraction is executed only when the state (the state 62 of FIG. 6) of the virtual machine is "in execution".

First, in step S111, the resource adjustment program 1157 aborts the process in execution by the virtual machine to be contracted. Specifically, as for new commands, the resource adjustment program 1157 terminates the reception of the new commands by the virtual machine and waits for the completion of the entire execution for the command in execution.

In step S112, the resource adjustment program 1157 refers to the block storage function table 60 (FIG. 6) to determine whether the function (for example, the virtual port control function 96) executed only in a specific virtual machine is executed by the virtual machine. If it is determined that the function is executed (Yes in step S112), the process moves to step S113. If it is determined that the function is not executed (No in step S112), the process moves to step S114.

In step S113, the resource adjustment program 1157 inherits the function operated on the virtual machine to be contracted to another virtual machine. In this case, from the viewpoint of load distribution, the function 1_63 and the function 2_64 of the block storage function configuration table 60 (FIG. 6) are referenced to select the other virtual machine with the fewest functions in execution. More specifically, the resource adjustment program 1157 figures out which virtual machines execute which functions from the block storage function configuration table 60 and determines the virtual machine that needs to inherit the function. The resource adjustment program 1157 reads out the function 1 control information 73 or the function 2 control information 74 of FIG. 7 to attach the information to the inheriting virtual machine, and the process executed in the contracted virtual machine is restarted.

In step S114, the resource adjustment program 1157 updates the state 62 of the block storage function configuration table (described in FIG. 6).

In step S115, the resource adjustment program 1157 ends the OS and the block protocol control program on the virtual machine. The hypervisor program 1151 saves, in the drive unit 117, the content (saved image) of the LM of the contracted virtual machine. As a result, the processing time at a later expansion of the virtual machine can be reduced.

Lastly, in step S116, the resource adjustment program 1157 releases the cores and LM that are resources used in the contracted virtual machine. The released cores can be allocated to the application virtual machine (application VM) 20 or the file storage virtual machine (file storage VM) 21. The released LM returns to the pool area for virtual machine 1154. The LM can be allocated when another virtual machine is activated, or the LM area can be added and allocated to the virtual machine in operation.

<Core Management Table>

Figure 12:
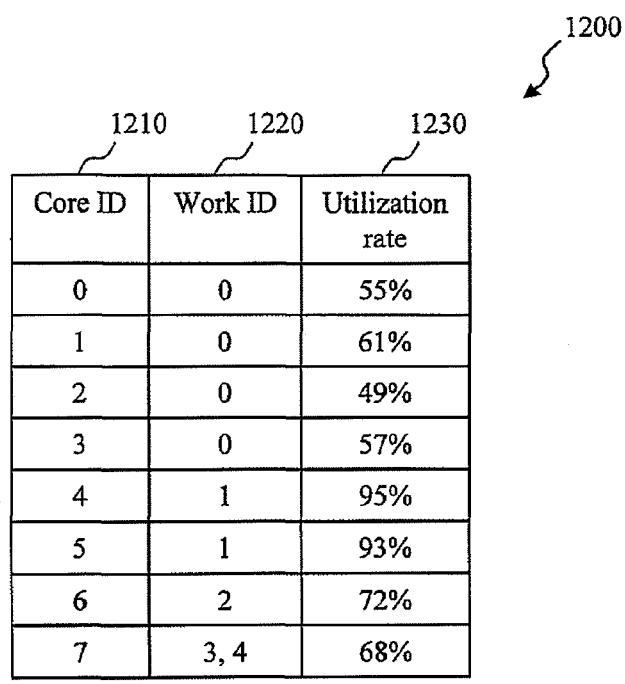
FIG. 12 is a diagram showing an example of configuration of a core management table.
Figure 13:
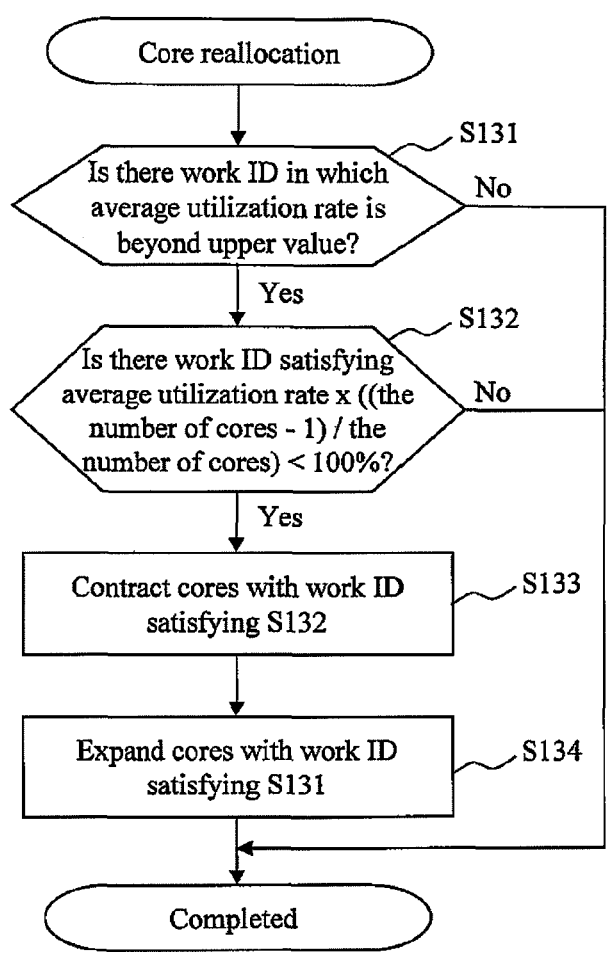
FIG. 13 is a flow chart for explaining a core distribution review process.

FIG. 12 is a diagram showing an example of configuration of a core management table 1200 included in the hypervisor configuration information 1152. The core management table 1200 holds input values used by the resource adjustment program 1157 to execute the core reallocation process (FIG. 13).

The core management table 1200 includes, as configuration items, a core ID 1210, a Work_ID 1220, and a utilization rate 1230.

The core ID 1210 denotes identifiers of the cores 118 in the controller board 110 or 120. The Work_ID 1220 is information indicating the types of the functions to which the cores are allocated. For example, if the Work ID=0 indicates the block storage function, the core IDs 0, 1, 2, and 3 are allocated to the block storage function. A plurality of Work_IDs are associated with one core ID in some cases, and this indicates that the virtual machines constituting the plurality of Work_IDs share the core in a time-division manner. The utilization rate 1230 stores measurement results of the time rate of processes executed by the core within a certain period.

<Core Distribution Review Process>

FIG. 13 is a flow chart for explaining the core reallocation process executed by the resource adjustment program 1157 at a predetermined timing. Examples of the predetermined timing include: periodical; predetermined time after system activation; when there is an instruction from the management terminal 16; and when the fact that the utilization rate is over a predetermined value in a core is detected. However, the predetermined timing can be an arbitrary timing.

First, in step S131, the resource adjustment program 1157 calculates, for each Work_ID, an average utilization rate obtained by averaging the utilization rates 1230 of all cores included in the Work ID based on the utilization rate 1230 of the core management table 1200 and determines whether any value is beyond the upper value defined in advance by the developer or the user of the system. Here, whether the load of the core managing the Work_ID is excessive is checked. If there is no pertinent Work_ID (No in step S131), the core reallocation process is completed.

In step S132, the resource adjustment program 1157 extracts the Work_ID in which the average utilization rate similar to the one in step S131 is below a predetermined condition based on the utilization rate 1230 of the core management table 1200. Here, whether there are adequate cores is checked for the Work_ID. An example of the predetermined condition includes that the average utilization rate×((the number of cores−1)/the number of cores)<100% is satisfied. This is a condition for extracting the one that the average utilization rate can be estimated not to reach 100% even if one virtual machine of the Work_ID is contracted. For example, if there are three cores executing the Work_ID=1 and the utilization rates are 40%, 30%, and 40%, respectively, the result is 110/300<100% according to the conditional expression. Even if one core is removed from the Work_ID=1, the left-hand side of the conditional expression is 110/200, which is not beyond 100%. Therefore, it can be understood that there are adequate cores managing the Work_ID=1. Although the extraction conditions are illustrated in steps S131 and S132, the arrangement is not limited to this.

In step S133, the resource adjustment program 1157 contracts the cores that manage the Work_ID extracted in step S132. In relation to a function in which the cores are allocated to the virtual machines as in the block storage function unit and that is constituted by a plurality of virtual machines, the cores are contracted based on the contraction process (FIG. 11) of the virtual machines. However, the contraction beyond the number of increased cores estimated in step S134 is not performed, and step S133 ends when the number of decreased cores reach the number.

In step S134, the resource adjustment program 1157 expands the cores to the Work_ID extracted in step S131. In relation to the function in which the cores are allocated to the virtual machines as in the block storage function unit and that is constituted by a plurality of virtual machines, the cores are expanded based on the expansion process (FIG. 10) of virtual machines.

In the present embodiment, the number of cores (the number of virtual machines in the case of the block storage function unit) allocated to each function type is determined from the viewpoint of balancing the utilization rates of the cores of the CPU. Alternatively, a determination method of contracting a part of the virtual machines constituting the block storage function unit to realize an operation of solving the memory shortage by releasing the LM can be adopted to solve the shortage of the memory generated in another function type.

<Conclusion>

According to the present embodiment, a memory included in a storage subsystem (computer system) includes a fixed area for storing information shared by a plurality of virtual machines and a pool area storing information specific to each of the plurality of virtual machines. When a virtual machine is activated in response to a request from a management terminal, a fixed area (SM) shared and used by the plurality of virtual machines in the storage subsystem is allocated to the virtual machine to be activated, and a specific storage area (LM) is dynamically allocated from the pool area. In this way, the plurality of virtual machines share and use the fixed area of the memory, and the plurality of virtual machines can cooperate to operate.

There is also a mode in which the storage subsystem includes a plurality of controller boards, and a bridge connects the controller boards. In this case, the memory of each controller board also includes the fixed area shared and used by the virtual machines and the specific storage area used only by each virtual machine When a controller board receives a request of activation of a virtual machine, the controller board allocates the fixed area to the virtual machine to be activated and dynamically allocates the specific storage area. The fixed area is classified into a first fixed area for storing information shared by a plurality of virtual machine in the same controller board and a second fixed area for storing information shared by a plurality of virtual machines of different controller boards. This allows a plurality of virtual machines to cooperate and integrally operate even in a duplicated (clustered) storage subsystem.

The virtual machines that integrally operate may be limited to the virtual machines that realize a block storage control function. This is because there is less demand for the virtual machines that realize a file storage control function and an application control function to cooperate and operate, compared to the block storage control function.

When an instruction for expansion of a virtual machine is received from the management terminal, a processor core and the specific storage area (LM) necessary for setting the virtual machine are secured. Whether the virtual machine to be expanded is activated in the past and currently terminated is determined, and if the virtual machine is terminated, content of the specific storage area used at the previous activation is read out from the drive unit to set the virtual machine. Upon the setting, the fixed area (SM) is also allocated to the virtual machine to be expanded as described above. In this way, the virtual machine that has been activated before can be activated just by loading the content of the previously used LM, and the time for activation can be reduced.

Meanwhile, when an instruction for contraction of a virtual machine is received from the management terminal, whether a specific function is executed in the virtual machine to be contracted is determined. If a specific function is executed, the specific function is inherited to another virtual machine. More specifically, the virtual machine that inherits the function executes the specific function to enable the use of control information of the function before the reception of the instruction of contraction. The processor core and the specific storage area used by the virtual machine to be contracted are released. In this way, the hardware resources can be efficiently used, and an inconvenience that the function is terminated by contraction can be solved. The content of the LM of the contracted virtual machine may be saved in the drive unit. As a result, the content of the saved LM can be read out and simply restored when the contracted virtual machine is activated again.

In the case of the block storage control function, a virtual port function for executing a command distribution process is included in a virtual machine of the controller board. In this case, the fixed area (SM) of the memory stores virtual port control information for realizing a virtual port. A command from the host computer is temporarily gathered to the virtual machine including the virtual port function, and the command is distributed from the virtual machine including the virtual port function to the plurality of virtual machines (including the virtual machine with the virtual port function). This can prevent a situation that the processes are concentrated on one virtual machine in a system in which a plurality of virtual machines cooperate and integrally operate, and the load distribution in the plurality of virtual machines can be realized.

Utilization rates of processor cores allocated to the virtual machines may be monitored, and the distribution of the processor cores to the plurality of virtual machines may be reconfigured based on the result of monitoring. In this way, the processor cores can be allocated from virtual machines with adequate resources to virtual machines without adequate resources, and the hardware resources can be efficiently used.

As described, according to the present embodiment, the minimum memory capacity can be secured in accordance with the increase and decrease of the virtual machines in relation to a function such as a block protocol control program that requires a shared memory. Therefore, the performance of the system improves by optimal management of the virtual machines that execute other functions, such as a file storage control program and an application program, and by optimal management of the memory capacity.

Although the storage subsystem is illustrated as an example of the computer system, and the processing content and the operation of the storage subsystem has been described in the present embodiment, the present invention is not limited to these. For example, the present invention can also be applied to a system that sets a plurality of virtual servers in the system to cause the virtual servers to cooperate and integrally operate.

The present invention can be realized by a program code of software for realizing the functions of the embodiment. In that case, a storage medium recording the program code is provided to a system or an apparatus, and a computer (or CPU or MPU) of the system or the apparatus reads out the program code stored in the storage medium. In that case, the program code read out from the storage medium realizes the functions of the embodiment, and the program code and the storage medium storing the program code constitute the present invention. Examples of the storage medium for supplying the program code include a flexible disk, a CD-ROM, a DVD-ROM, a hard disk, an optical disk, a magneto-optical disk, a CD-R, a magnetic tape, a nonvolatile memory card, and a ROM.

An OS (operating system) or the like operated on the computer may execute part or all of the actual processes based on an instruction of the program code, and the processes may realize the functions of the embodiment. A CPU or the like of the computer may execute part or all of the actual processes based on an instruction of the program code after the program code read out from the storage medium is written in a memory on the computer, and the processes may realize the functions of the embodiment.

The program code of the software for realizing the functions of the embodiment may be distributed through a network to store the program code in a storage section, such as a hard disk and a memory of a system or an apparatus, or in a storage medium, such as a CD-RW and a CD-R, and a computer (or CPU or MPU) of the system or the apparatus may read out the program code stored in the storage section or the storage medium upon use to execute the program code.

Lastly, it needs to be understood that the processes and the techniques described herein are essentially not related to any specific apparatuses but can be implemented by any suitable combinations of the components. Furthermore, various types of general-purpose devices can be used in accordance with the teaching described herein. It may be understood that construction of a dedicated apparatus may be beneficial to execute steps of the methods described herein. Appropriate combinations of a plurality of constituent elements disclosed in the embodiments can form various inventions. For example, some constituent elements may be deleted from all constituent elements illustrated in the embodiments. Furthermore, constituent elements across different embodiments may be appropriately combined. Although the present invention has been described in relation to specific examples, the specific examples are not for the restrictions in any sense, but are for the description. Those skilled in the art would understand that there are a multiplicity of combinations of hardware, software, and firmware suitable for carrying out the present invention. For example, the described software can be implemented by a wide range of programs or script languages, such as assembler, C/C++, perl, Shell, PHP, and JAVA (registered trademark).

In the embodiments, control lines and information lines considered necessary for the description are illustrated, and all control lines and information lines of the product may not be necessarily illustrated. All configurations may be connected to each other.

In addition, those with general knowledge of the technical field would recognize other implementations of the present invention from the examination of the disclosed description and embodiment of the present invention. Various modes and/or components of the described embodiment can be used individually or by any combinations in a computerized storage system with a function of managing data. The description and the specific examples are only typical ones, and the scope and the spirit of the present invention are illustrated in the following claims.

REFERENCE SIGNS LIST 1 storage system
11 storage subsystem
12 SAN
13 LAN
14 host computer for access by block protocol
15 host computer for access by file protocol
16 management terminal
20 application VM
21 file storage VM
22 block storage function unit 1
23 block storage function unit 2
31 physical address 1
36 physical address 2
32 application VM local address
33 file storage VM local address
34 VM1 local address
35 VM2 local address
71 virtual port control table area
91 virtual port queue
96 virtual port control function
115 memory
117 drive unit
119 bridge
110 controller board 1
120 controller board 2

The invention claimed is:

1. A computer storage subsystem that sets a plurality of virtual machines and that provides calculation results by the plurality of virtual machines to a host computer, the computer storage subsystem comprising:
a plurality of controller boards each which controls the storage subsystem; and a connection device that connects the plurality of controller boards, wherein
each of the plurality of controller boards includes a processor that generates a virtual machine by securing hardware resources in accordance with an allocation request, and a memory that stores at least virtual machine setting information for setting the virtual machine and virtual machine management information for managing the virtual machine, wherein
each of the plurality of controller boards includes a plurality of virtual machines,
each memory of the plurality of controller boards comprises: a first fixed area for storing information shared by a plurality of virtual machines within the same controller board; a second fixed area for storing information shared by a plurality of virtual machines of different controller boards; and a dynamic pool area for storing information specific to each of the plurality of virtual machines within the same controller board,
each memory of the plurality of controller boards stores, as the virtual machine setting information, information indicative of correspondence relationship between each function of the controller board and a portion of the first and second fixed areas to be used for the each function of the controller board, and core management information for managing utilization rates of processor cores associated with functions allocated to each processor core, and
each processor of the plurality of controller boards allocates the first and second fixed areas for the each function of the controller board to the virtual machines to be activated based on the information indicative of the correspondence relationship, dynamically allocates a specific storage area to the virtual machine to be allocated from the dynamic pool area, and enables the plurality of virtual machines set to the same and different controller boards to cooperate and operate, wherein,
the processor monitors utilization rates of processor cores by referencing the core management information and reconfigures distribution of the processor cores to the plurality of virtual machines based on a result of the monitoring, wherein,
if an average utilization rate of all processor cores allocated to the same function monitored is beyond a predetermined value, the processor expands the processor cores with the function, and
if a value of (the average utilization rate*((the number of the core processors allocated to the same function monitored −1)/(the number of the core processors allocated to the same function monitored))) is less than 1, the processor cores contracts with the function.

2. A computer storage subsystem according to claim 1, wherein when a virtual machine that realizes a block storage control function is activated, the processor allocates the fixed area to the virtual machine.

3. A computer storage subsystem according to claim 1, wherein when an instruction for expansion of a virtual machine is received, the processor secures a processor core necessary to set the virtual machine and the specific storage area, determines whether the virtual machine to be expanded is activated in the past and currently terminated, and if the virtual machine is terminated, reads out content of the specific storage area used at the previous activation from a storage device to set the virtual machine.

4. A computer storage subsystem according to claim 1, wherein when an instruction for contraction of a virtual machine is received, the processor determines whether a specific function is executed in the virtual machine to be contracted, inherits the specific function to another virtual machine if the specific function is executed, and releases a processor core and the specific storage area used by the virtual machine to be contracted.

5. A computer storage subsystem according to claim 4, wherein the processor saves content of the specific storage area of the virtual machine to be contracted in a storage device and enables to read out and restore the content of the specific storage area saved in the storage device when the virtual machine to be contracted is activated again.

6. A computer storage subsystem according to claim 1, wherein at least one of the plurality of virtual machines comprises a virtual port function for executing a command distribution process, a fixed area of the memory stores virtual port control information for realizing the virtual port, and the processor temporarily gathers a command from the host computer to the virtual machine having the virtual port function and distributes the command to the plurality of virtual machines from the virtual machine having the virtual port function.

7. A virtual machine control method of setting and operating a plurality of virtual machines in a computer system storage subsystem, the computer storage subsystem comprising a plurality of controller boards; and a connection device that connects the plurality of controller boards wherein each of the plurality of controller boards comprises (i) a memory that stores at least storing virtual machine setting information for setting a virtual machine and virtual machine management information for managing the virtual machine and that includes a first fixed area for storing information shared by a plurality of virtual machines within the same controller board; and a second fixed area for storing information shared by a plurality of virtual machines of different controller boards; and a dynamic pool area for storing information specific to each of the plurality of virtual machines within the same controller board and (ii) a processor, and wherein each memory of the plurality of controller boards stores, as the virtual machine setting information, information indicative of correspondence relationship between each function of the controller board and a portion of the first and second fixed areas to be used for the each function of the controller board, and core management information for managing utilization rates of processor cores associated with functions allocated to each processor core, the virtual machine control method comprising:

a step, by the processor, of responding to an allocation request to secure hardware resources based on the virtual machine setting information; and a step, by the processor, of allocating the first and second fixed areas for the each function of the controller board to the virtual machines to be activated based on the information indicative of the correspondence relationship, dynamically allocating a specific storage area to the virtual machine to be allocated from the dynamic pool area, and enabling the plurality of virtual machines set to the same and different controller boards to cooperate and operate, a step, by the processor, of monitoring utilization rates of processor cores by referencing the core management information and reconfigures distribution of the processor cores to the plurality of virtual machines based on a result of the monitoring, wherein if an average utilization rate of all processor cores allocated to the same function monitored is beyond a predetermined value, the processor expands the processor cores with the function, and if a value of (the average utilization rate*((the number of the core processors allocated to the same function monitored −1)/(the number of the core processors allocated to the same function monitored))) is less than 1, the processor cores contracts with the function.

8. A virtual machine control method according to claim 7, wherein when a virtual machine that realizes a block storage control function is activated, the processor allocates the fixed area to the virtual machine.

9. A virtual machine control method according to claim 7, further comprising:

when an instruction for expansion of a virtual machine is received, a step by the processor securing a processor core necessary to set the virtual machine and the specific storage area; and a step, by the processor, of determining whether the virtual machine to be expanded is activated in the past and currently terminated, and if the virtual machine is terminated, reading out content of the specific storage area used at the previous activation from a storage device to set the virtual machine.

10. A virtual machine control method according to claim 7, further comprising:

when an instruction for contraction of a virtual machine is received, a step by the processor determining whether a specific function is executed in the virtual machine to be contracted and inheriting the specific function to another virtual machine if the specific function is executed; and a step, by the processor, of releasing a processor core and the specific storage area used by the virtual machine to be contracted.

11. A virtual machine control method according to claim 7, wherein at least one of the plurality of virtual machines comprises a virtual port function for executing a command distribution process, the fixed area of the memory stores virtual port control information for realizing the virtual port, and the method further comprises:

a step, by the processor, of temporarily gathering a command from the host computer to the virtual machine having the virtual port function; and a step, by the processor, of distributing the command to the plurality of virtual machines from the virtual machine having the virtual port function.

12. A virtual machine control method according to claim 7, further comprising:

a step, by the processor, of monitoring utilization rates of processor cores; and a step, by the processor, of reconfiguring distribution of the processor cores to the plurality of virtual machines based on a result of the monitoring.

\* \* \* \* \*